Patented Nov. 29, 1938

2,138,756

UNITED STATES PATENT OFFICE 2,138,756

4-METHYL URACIL AND HOMOLOGUES THEREOF

Albert B. Boese, Jr., Pittsburgh, Pa., assignor to Carbide and Carbon Chemicals Corporation, a corporation of New York No Drawing. Application May 20, 1936, Serial No. 80,713

9 Claims. (Cl. 260—260)

This invention relates to a process for the production of 4-methyl uracil and homologues thereof by reacting diketene with urea, or with a symmetrical disubstituted urea such as α-diethyl urea, diallyl urea, and ethylene urea. 4-methyl uracil is of physiological significance, and may be of value pharmacologically.

In accordance with the invention, a mixture of approximately equimolecular portions of diketene and urea, or a symmetrical disubstituted urea, is heated under reflux for a number of hours, preferably in the presence of a volatile solvent for the diketene which is inert to the reactants. Carbon dioxide is evolved during the reaction. The reaction mixture then is filtered and the precipitate, after washing with solvent to remove excess diketene, is extracted with cold water to remove the remaining unused amide reactant. The residual product may be purified by recrystallization from hot water.

The filtrate secured by the above procedure contains some decomposition products of diketene, including acetone, acetic acid, and dehydracetic acid.

The reactions involved may be illustrated by the following equation:

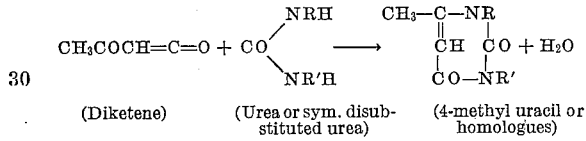

(Diketene) (Urea or sym. disubstituted urea) (4-methyl uracil or homologues)

wherein either or both R and R', respectively, represent the same or different alkyl or aryl radicals, or hydrogen.

The following example will serve to illustrate the invention:

To a suspension of 17.8 grams of urea in 75 c. c. of dioxan was added 24.9 grams of diketene. The mixture then was heated under reflux for 12 hours, during which time it turned yellow, and carbon dioxide was evolved. The reaction mixture then was filtered, and the precipitate was washed with dioxan, and was air-dried at room temperature. Twenty grams of a yellow crystalline material was obtained. The latter was extracted with cold water to remove unchanged urea. The residue consisted of 8 grams of 4-methyl uracil which, after several recrystallizations from hot water, yielded colorless needles which melt with decomposition at from 315° C. to 320° C. It is practically insoluble in non-polar solvents, such as benzene, toluene, petroleum ether, and ethylene dichloride, and is only sparingly soluble in water and alcohol.

Distillation of the filtrate secured in the abovementioned filtration yielded in addition to dioxan 4.0 c. c. of acetone, a small amount of acetic acid, and 13 grams of a residue which was largely dehydracetic acid.

By removing the water formed in the reaction as rapidly as possible, it is possible to minimize any tendency for the diketene to react with the water and be decomposed thereby.

The smoothness of the reaction between diketene and the urea or symmetrical disubstituted urea is enhanced by conducting the reaction in the presence of a solvent for the latter which is a solvent for but inert with respect to the diketene.

I claim:

1. The method for producing a chemical compound having the general structure designated by the formula

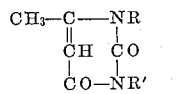

which comprises reacting diketene with a compound having a structure designated by the formula NHRCONHR', wherein R and R' respectively designate a radical selected from the group consisting of hydrogen, and alkyl radicals, R and R' being alike, in the presence of a volatile solvent for the diketene which is inert to the reactants.

2. The method for producing a chemical compound having the general structure designated by the formula

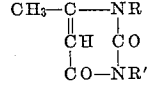

which comprises refluxing diketene with a compound having a structure designated by the formula NHRCONHR', wherein R and R' respectively designate a radical selected from the group consisting of hydrogen, and alkyl radicals, R and R' being alike, in the presence of a volatile solvent for the diketene which is inert to the reactants.

3. The method for producing a chemical compound having the general structure designated by the formula

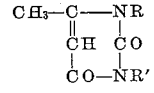

which comprises reacting diketene with a compound having a structure designated by the formula NHRCONHR', wherein R and R' respectively designate a radical selected from the group consisting of hydrogen, and alkyl radicals, R and R' being alike, in the presence of a volatile solvent for the diketene which is inert to the reactants, filtering the resultant reaction mixture and isolating the solid components thereof, and recovering the said chemical compound from the latter.

4. The method for producing a chemical compound having the general structure designated by the formula

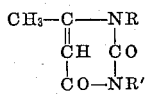

which comprises reacting diketene with a compound having a structure designated by the formula NHRCONHR', wherein R and R' respectively designate a radical selected from the group consisting of hydrogen, and alkyl radicals, R and R' being alike, in the presence of a volatile solvent for the diketene which is inert to the reactants, filtering the reaction mixture thereby isolating the solid components thereof, removing unreacted diketene and NHRCONHR' from the latter, and recovering the thus purified chemical compound as a residue.

5. The method of producing 4-methyl uracil, which comprises reacting diketene and urea in the presence of a volatile solvent for the diketene which is inert to the reactants.

6. The method of producing 4-methyl uracil, which comprises reacting diketene and urea in the presence of a volatile solvent for the diketene which is inert to the reactants, separating the precipitate from the resultant reaction mixture, removing therefrom unreacted diketene and urea, and recovering the residual 4-methyl uracil.

7. The method of producing 4-methyl uracil, which comprises refluxing diketene and a suspension of urea in a medium boiling solvent for the diketene, separating the insoluble portion of the resultant reaction mixture from the remainder thereof, and separately recovering from such insoluble portion the 4-methyl uracil.

8. The process of producing 4-methyl uracil, which comprises refluxing diketene with a suspension of urea in dioxan, separating from the resultant reaction mixture the insoluble portion thereof and separately recovering from the latter the 4-methyl uracil.

9. The method of producing a chemical compound having the general structure designated by the formula

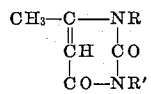

wherein R and R' respectively designate a radical selected from the group consisting of hydrogen, and alkyl radicals, which comprises reacting diketene with a compound selected from the group consisting of urea and the symmetrical alkyl-disubstituted urea.

ALBERT B. BOESE, Jr.